(12) United States Patent
Isaka et al.

(10) Patent No.: US 7,168,701 B2
(45) Date of Patent: Jan. 30, 2007

(54) PAPER TRANSPORTING APPARATUS

(75) Inventors: Norihisa Isaka, Tokyo (JP); Yasuyuki Kato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1059 days.

(21) Appl. No.: 09/994,800

(22) Filed: Nov. 28, 2001

(65) Prior Publication Data

US 2002/0063906 A1  May 30, 2002

(30) Foreign Application Priority Data

Nov. 29, 2000  (JP) .............................. 2000-362830

(51) Int. Cl.
*B65H 5/02*  (2006.01)
(52) U.S. Cl. .................. 271/273; 271/65; 271/291; 271/301
(58) Field of Classification Search .............. 271/272, 271/273, 65, 291, 301; 399/401, 364, 374
See application file for complete search history.

(56) References Cited

U.S. PATENT DOCUMENTS 5,236,339 A * 8/1993 Nishiumi et al. ........... 194/343
6,145,828 A * 11/2000 Arai ........................... 271/3.03
6,722,647 B2 * 4/2004 Kato et al. .................. 271/3.03
6,799,008 B1 * 9/2004 Lim ............................ 399/124
6,848,849 B2 * 2/2005 Kobayashi .................. 400/624

FOREIGN PATENT DOCUMENTS

JP  10-212049 A  8/1998

* cited by examiner

*Primary Examiner*—David H. Bollinger
(74) *Attorney, Agent, or Firm*—Rabin & Berdo, PC (57) ABSTRACT

A paper-transporting apparatus is used for transporting recording paper. A paper-transporting device is movable between a loading position where the paper-transporting unit has been completely attached into a chassis and an unloading position where the paper-transporting unit has been completely drawn out of the chassis. A guide member that supports the paper-transporting device and guides the paper-transporting device between the loading position and the unloading position. The paper-transporting device has a cover and a frame that cooperate with each other to form a paper path in which a recording paper is advanced. When the paper-transporting device is at the loading position, a positioning device holds the cover at a certain position with respect to the frame. When the paper-transporting device is at the unloading position, the positioning device does not hold the cover at the certain position with respect to the frame.

6 Claims, 13 Drawing Sheets

PAPER TRANSPORTING APPARATUS

FIELD OF THE INVENTION

The present invention relates to a paper-transporting apparatus for use in an image-recording apparatus, and more particularly to a paper-transporting apparatus for use in an image-recording apparatus capable of printing on both sides of a sheet of paper.

DESCRIPTION OF THE RELATED ART

A conventional paper-transporting apparatus for use in an image-recording apparatus includes a unit assembly with a paper-transporting mechanism suitable for printing on both sides of a sheet of print paper. The unit includes a frame that supports a drive roller, an upper cover that supports a driven roller, and other associated structural members that fix the upper cover at a predetermined position. The upper cover is provided on a side from which a user can access the paper-transporting mechanism. When a paper jam occurs, the user draws out the unit assembly from the main body of the image-recording apparatus. Then, the user unlocks firmly fixed members manually before opening the upper cover to remove the jammed paper.

The conventional paper-transporting apparatus for double-sided printing suffers from the following problem. When jammed paper is removed from the unit assembly, the user must first take out the unit assembly from the image-recording apparatus and then open a latching device that holds the upper cover against the frame, before the upper cover can be opened. This operation is complex.

The unit assembly has drive rollers that are rotatable in forward and reverse directions and a plurality of pressure rollers driven by the drive rollers. The upper cover may be subjected to deformation such as warping or bulge in its middle portion due to the urging force of springs that urge the pressure rollers against the drive rollers. Deformation of the upper cover causes the print paper to become skewed and jammed. Thus, the drive rollers and driven rollers will not apply uniformly distributed pressure to the paper passing between the drive rollers and driven rollers. A non-uniform application of pressure often causes the paper to become skewed or jammed.

SUMMARY OF THE INVENTION

An object of the invention is to provide a paper transportation apparatus in which when paper is jammed in a paper-transporting mechanism used for double-sided printing, the jammed paper can be removed without difficulty.

Another object of the invention is to provide a paper-transporting apparatus that minimizes deformation of an upper cover of a paper-transporting mechanism resulting from urging forces of springs that urge pressure rollers, thereby allowing stable paper transportation.

A paper-transporting apparatus is used for transporting a recording medium. A paper-transporting device movable between a loading position where the paper-transporting unit has been completely attached into a chassis and an unloading position where the paper-transporting unit has been completely drawn out of the chassis. The paper-transporting device having a first section and a second section that cooperate with each other to advance a recording medium. A guide member that supports the paper-transporting device and guides the paper-transporting device between the loading position and the unloading position. A positioning device that holds the first section at a certain position with respect to the second section when the paper-transporting device is at the loading position, the positioning device does not hold the first section at the certain position with respect to the second section when the paper-transporting device is at the unloading position.

The positioning member includes a first engagement member movable relative to the second section toward the loading position and toward the unloading position. The first engagement member being urged toward the loading position. The second engagement member fixedly provided on the chassis, wherein when the paper-transporting device is moved toward the loading position from the unloading position, the second engagement member engages the first engagement member to prevent the first engagement member from further moving toward the loading position such that the first engagement member moves relative to the second section toward the unloading position to hold the first section at the certain position with respect to the second sections.

The guide member includes a guide rail, a first projection, and a second projection. The guide rail guides the paper-transporting device between the loading position and the unloading position, the guide rail having a plurality of guide rollers disposed along the guide rail. The first projection is formed on the first section to extend along the guide rail. The second projection is formed on the second section to extend along the guide rail. The first projection and the second projection are placed together and supported on the guide rail such that the first projection and the second projection are movably sandwiched between the guide rollers.

A pressing member is further formed on the chassis. The pressing member moves into engagement with the second section to position the second section with respect to the first section before the second engagement member engages the first engagement member.

The pressing member moves out of engagement with the second section after the second engagement member has engaged the first engagement member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DESCRIPTION OF PREFERRED EMBODIMENTS

Embodiments of the present invention will be described in detail with reference to the accompanying drawings.

First Embodiment

{Construction}

Figure 1:
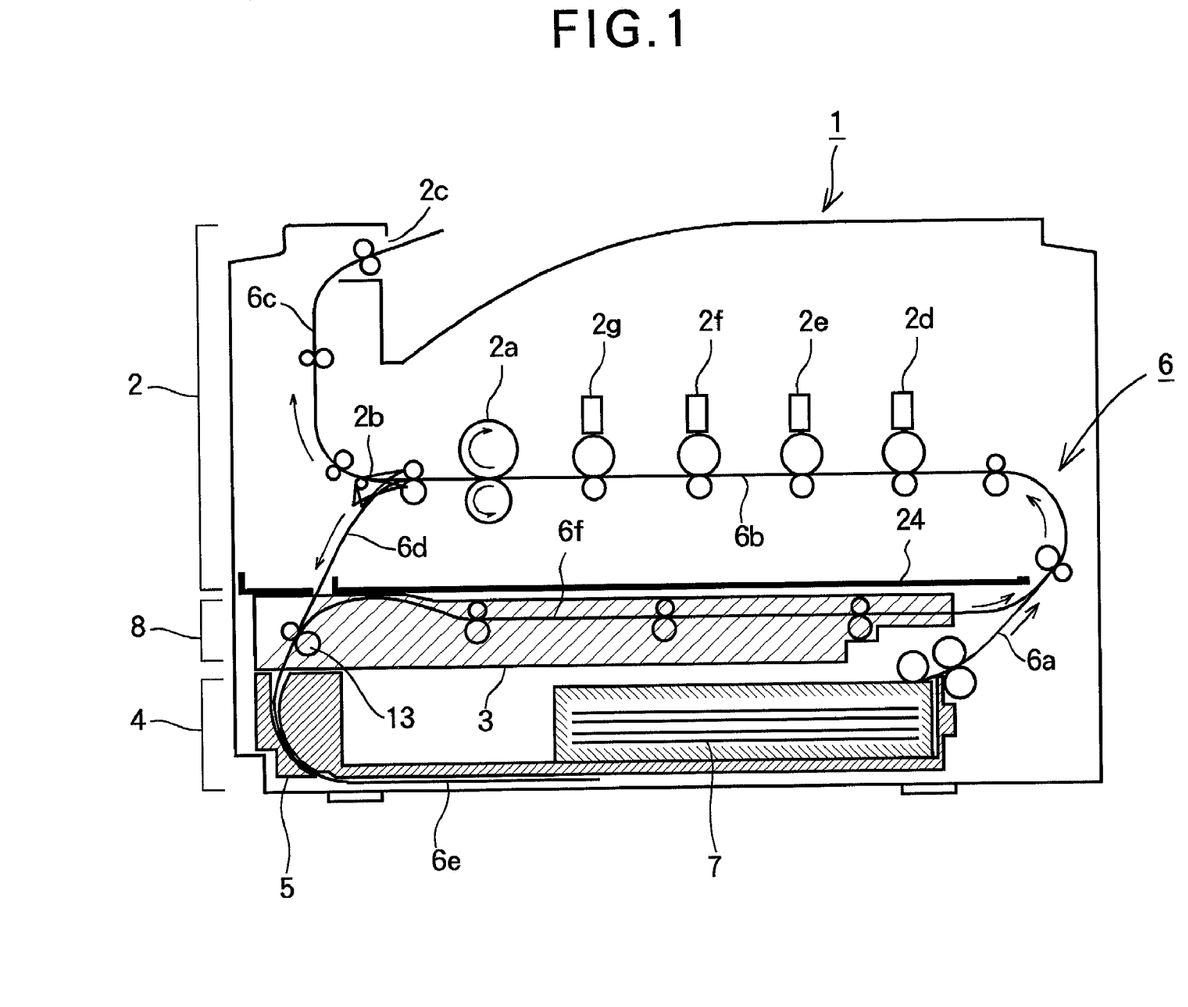
FIG. 1 illustrates a general configuration of an image-recording apparatus having a paper-transporting apparatus according to a first embodiment of the invention.

FIG. 1 illustrates a general configuration of an image-recording apparatus having a paper-transporting apparatus according to a first embodiment of the invention.

Referring to FIG. 1, a cassette-receiving section 4 receives a paper cassette 5 that holds a stack of recording paper 7 therein. A paper-transporting apparatus 8 has a guide means that supports a paper-transporting unit 3 thereon in such a way that the paper-transporting unit 3 can be loaded into and unloaded from the image-recording apparatus 1. The paper-transporting unit 3 transports the recording paper 7 when printing is performed on the both sides of the recording paper. A recording section 2 includes four print engines 2d–2g that transfer toner images of corresponding colors sequentially onto the recording paper 7 as the recording paper 7 passes through the path 6b. A fixing section 2a is located shortly after the print engine 2g and fuses the toner images transferred on the recording paper 7 into a permanent image.

The top page of the stack of recording paper 7 held in the paper cassette 5 is fed into a path 6a and passes through a path 6b in the recording section 2. When the recording paper 7 passes through the path 6b, images are transferred onto the recording paper 7 sequentially and then the recording paper 7 passes through the fixing section 2a and is finally guided by a paper guide 2b into an appropriate direction. The recording paper advanced into a path 6c for singled-sided printing and into a path 6d for double-sided printing.

Figure 2:
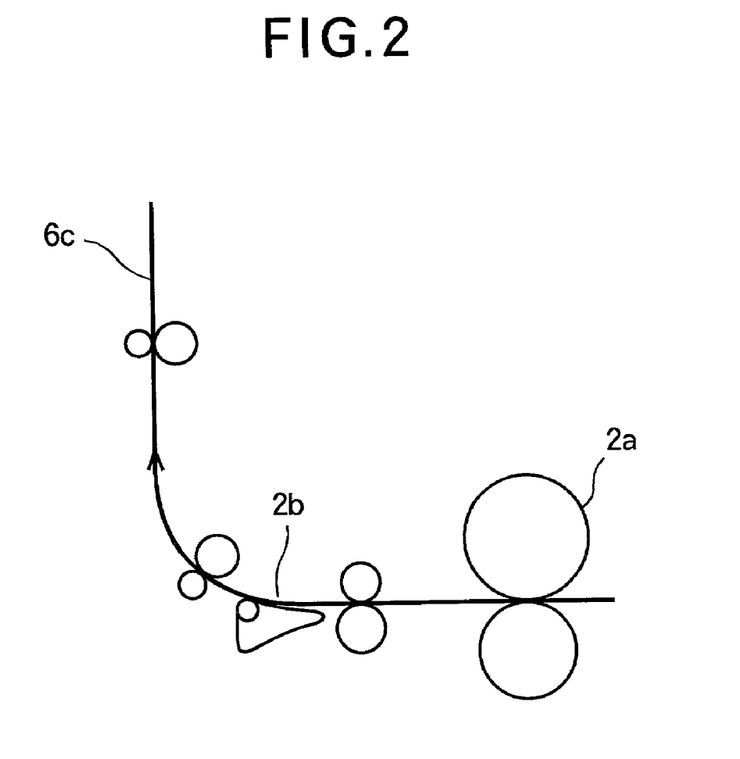
FIG. 2 illustrates the operation of a paper guide when an image is printed only on one side of recording paper.

FIG. 2 illustrates the operation of the paper guide when an image is printed only on one side of the recording paper 7.

When an image is printed only on one side of the recording paper 7, the paper guide 2b is at a position shown in FIG. 2 so that the printed recording paper 7 advances along the path 6c and is discharged through a discharging section 2c.

Figure 3:
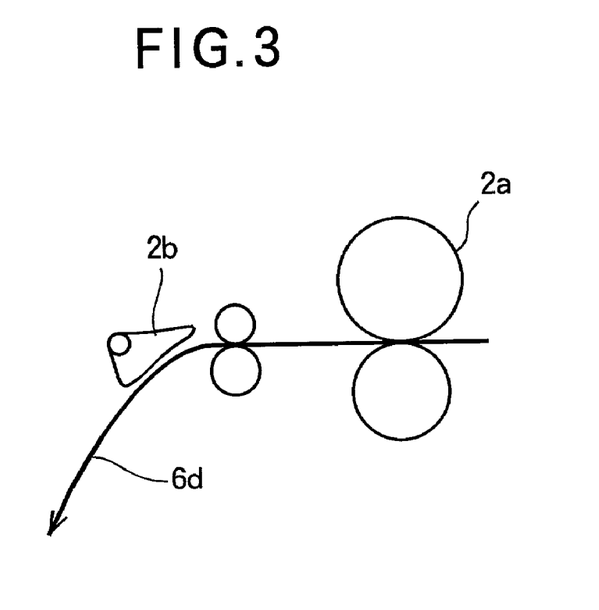
FIG. 3 illustrates the operation of the paper guide when images are printed on both sides of the recording paper.

FIG. 3 illustrates the operation of the paper guide 2b when images are printed on both sides of the recording paper 7. When images are printed on both sides of the recording paper 7, the paper guide 2b is at a position shown in FIG. 3 so that the recording paper 7 passes the fixing unit 2a and is then advanced along the path 6d. Subsequently, the transport rollers 13 advance the recording paper 7 into an auxiliary space 6e provided under the bottom of the paper cassette 5.

Then, as described later, the transport rollers 13 rotate in a reverse direction so as to advance the recording paper 7 into a path 6f in the paper transport unit 3 and then into the path 6b. When the recording paper 7 passes through the path 6b, images are transferred sequentially onto the backside of the recording paper 7. The recording paper 7 then passes through the fixing section 2a and then the paper guide 2b so that the recording paper 7 is finally discharged from the discharge section 2c.

Figure 4:
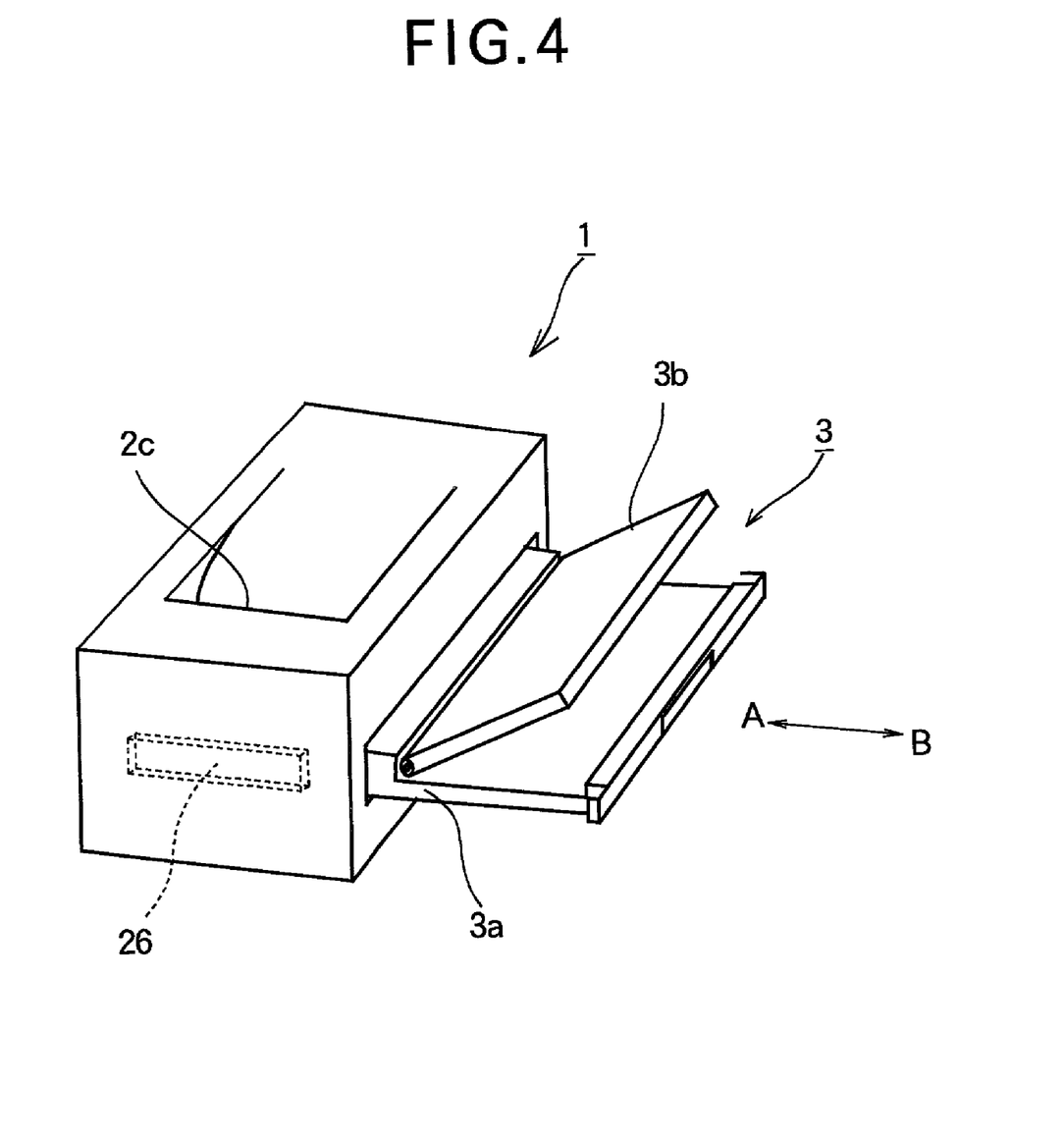
FIG. 4 is a perspective view of the image-recording apparatus, illustrating a paper-transporting unit when the paper-transporting unit is drawn out from the main body of an image-recording apparatus and a cover is rotated to open.

FIG. 4 is a perspective view of the image-recording apparatus, illustrating the paper-transporting unit 3 when the paper-transporting unit is drawn out from the main body of an image-recording apparatus 1 and a cover 3b is rotated to open.

Figures 5A, 5B:
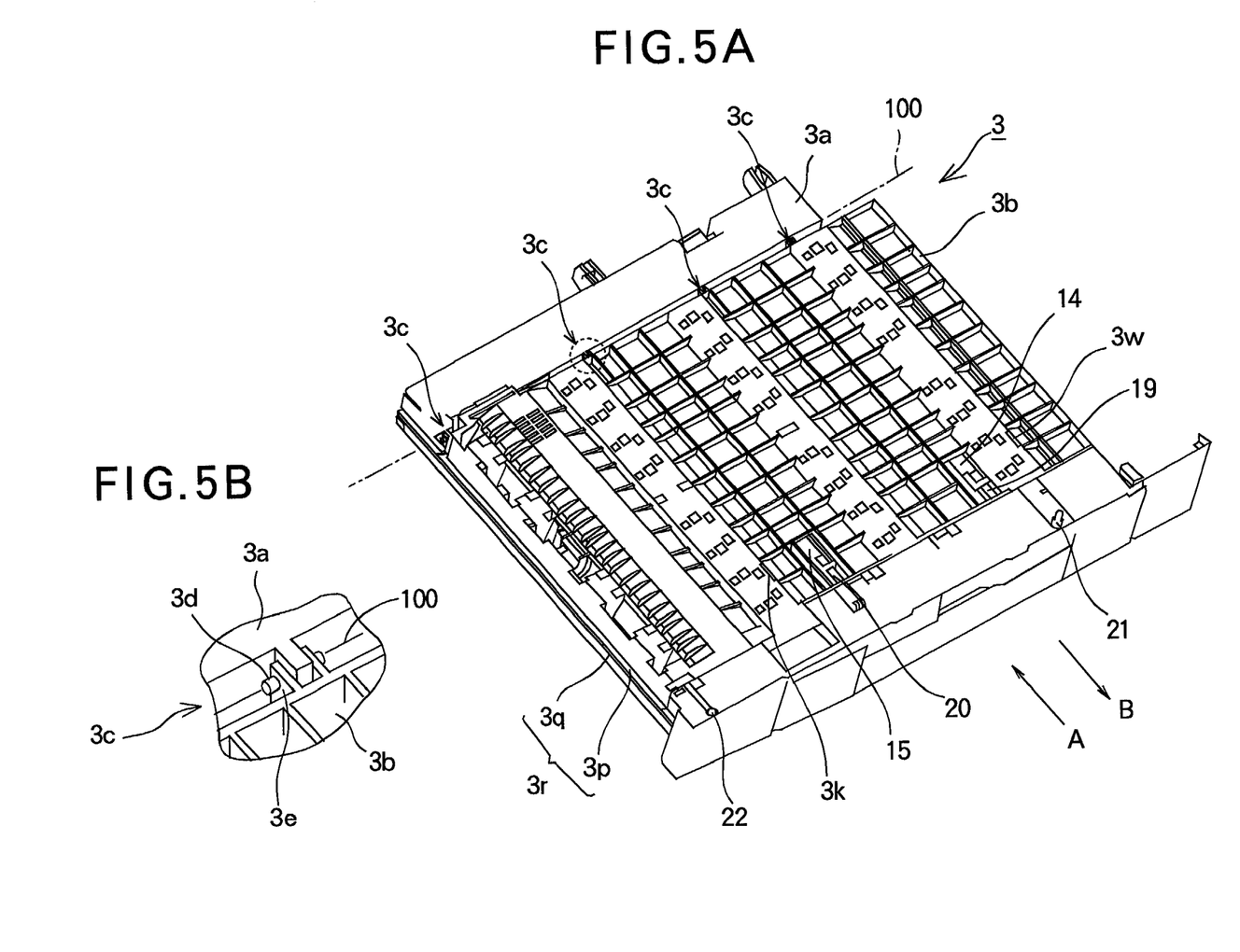
FIG. 5A is a perspective view illustrating the appearance of the paper-transporting unit when it is drawn out of the image-recording apparatus to an unloading position.
FIG. 5B shows the paper-transporting unit when the cover has been closed.

FIG. 5A is a perspective view illustrating the appearance of the paper-transporting unit when it is drawn out of the image-recording apparatus to the unloading position.

Referring to FIG. 5A, the cover 3b has been closed. The paper-transporting unit 3 is supported by a later described guide means that guides the paper-transporting unit 3 to slide in directions shown by arrows A and B.

FIG. 5B is a fragmentary enlarged perspective view of a bearing section, a portion encircled with a dotted line as shown in FIG. 5A, illustrating.

The cover 3b is rotatably supported at four bearings 3c on a frame 3a. Shafts 3d extend through the bearings 3e of the cover 3b and bearings 3c of the frame 3a so that the cover 3b is pivotally coupled to the frame 3a. Thus, the shafts 3d are in line with one another, so that the cover 3b can pivot through a predetermined angle about an axis 100 passing through the shafts 3d.

Figure 6:
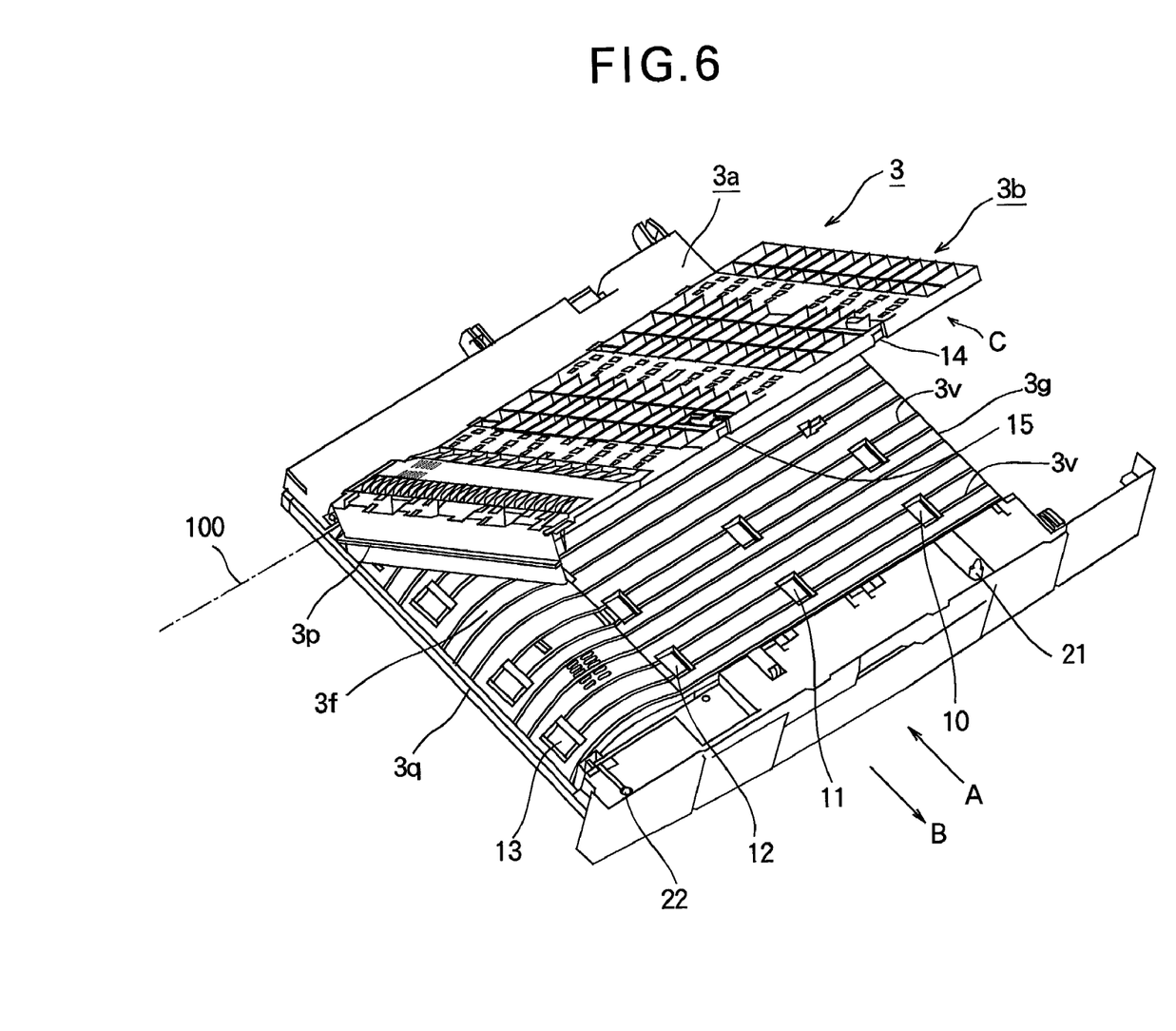
FIG. 6 illustrates the paper-transporting unit when paper-transporting unit is drawn out in a direction shown by an arrow to the unloading position and the cover is opened.

FIG. 6 illustrates the paper-transporting unit when paper-transporting unit is drawn out in a direction shown by arrow B to an unloading position and the cover is opened.

Referring to FIG. 6, a paper-transporting section 3g defined on the frame 3a has four sets 10–13 of transport rollers that rotate about axes substantially perpendicular to the axis 100. The paper-transporting section 3g has ribs 3v that extend in a direction in which the recording paper is transported. The ribs 3v guide the recording paper with least friction when the paper passes through the paper-transporting section 3g. The frame 3a encloses a drive motor, a motor driving circuit, a clutch, and a belt, not shown, which cooperate one another to drive all the transport rollers in rotation at predetermined timings and speed in the same direction. The frame 3a has a partially cylindrical surface 3f formed at the left side of the frame to project outwardly of the frame 3a such that the transport path has as large a curvature as possible to transport the recording paper without jamming. Four transport rollers 13 are provided such that the transport rollers 13 extend slightly outwardly of the cylindrical surface 3f.

The cover 3b has a projection 3p that extends laterally outwardly across the entire side portion of the cover 3b.

Figure 7:
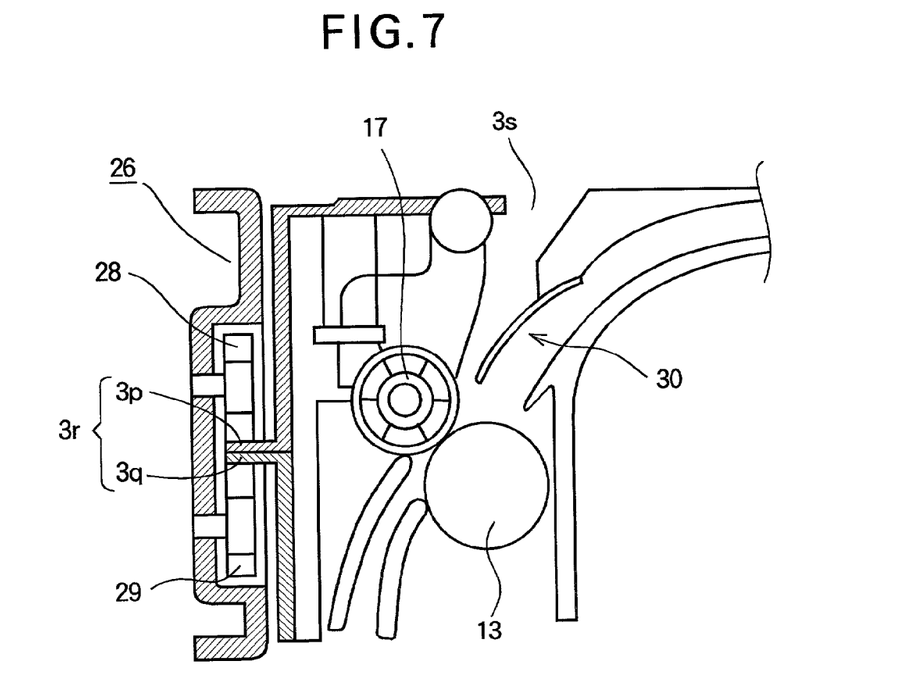
FIG. 7 is a fragmentary cross sectional side view of a pertinent portion of the paper-transporting unit.

FIG. 7 is a fragmentary cross sectional side view of a pertinent portion of the paper-transporting unit 3.

Figure 8:
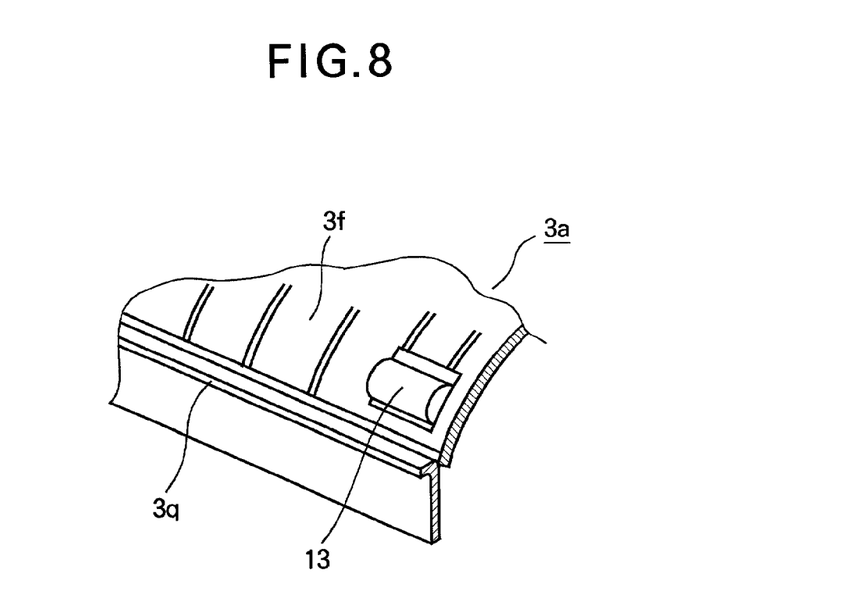
FIG. 8 is a fragmentary perspective view of a pertinent portion of the paper-transporting unit.

FIG. 8 is a fragmentary perspective view of a pertinent portion of the paper-transporting unit 3.

Referring to FIGS. 7 and 8, the frame 3a has an edge projection 3q that projects laterally outwardly from the side portion of the frame 3a and extends substantially across the side portion. When the cover 3b has been closed, the projection 3p is brought into intimate contact with the edge projection 3q to form a guide rail 3r. The projection 3p and the frame 3a in intimate contact engagement can smoothly slide, being guided between the rollers 28 and 29.

Figure 9:
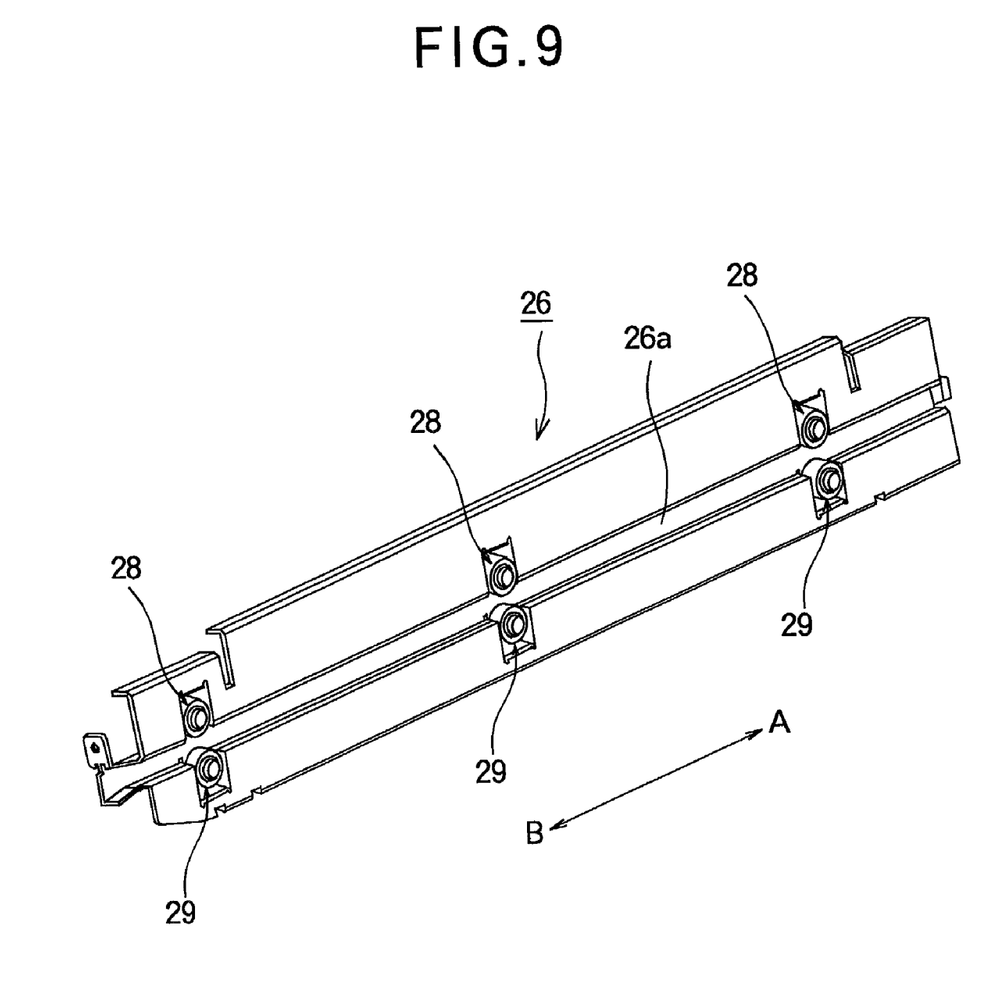
FIG. 9 is a perspective view illustrating the details of a guide rail.

FIG. 9 is a perspective view illustrating the details of a guide rail 26 of FIG. 4.

Referring to FIG. 9, the guide rail 26 has a guide groove 26a that is formed in the middle of the guide rail 26 and extends in the longitudinal direction of the guide rail 26. Three pairs of guide rollers are mounted to the guide rail 26 at predetermined intervals, each pair including a guide roller 28 and a guide roller 29 with the guide groove 26a therebetween. The guide rollers 28 and 29 are arranged such that circumferential surfaces of the guide rollers 28 and 29 face each other.

The guide rail 3r enters the guide groove 26a in the guide rail 26 so that the guide rollers 28 and 29 can roll on the guide rail 3r. Thus, the guide rail 3r is guided to move in the directions shown by arrows A and B.

Figure 10:
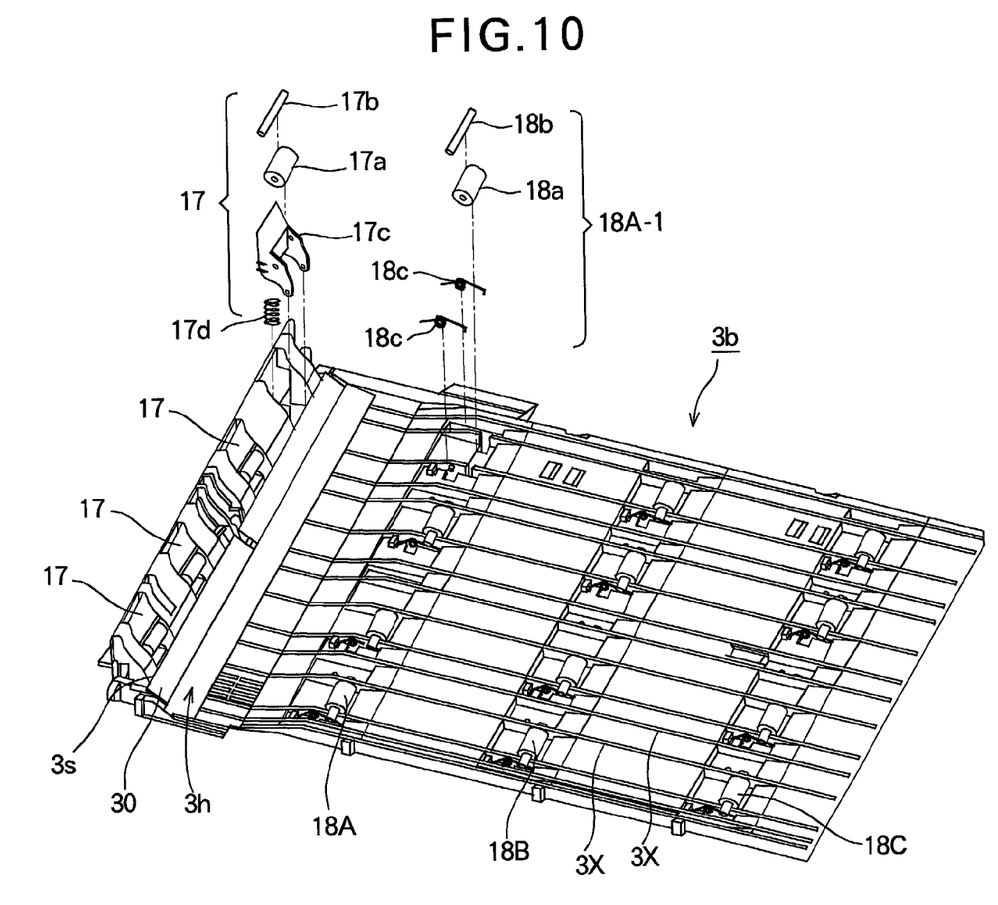
FIG. 10 is a perspective view of the cover when it is seen from a direction shown by arrow C of FIG. 6.

FIG. 10 is a perspective view of the cover 3b when it is seen from a direction shown by arrow C of FIG. 6.

The cover 3b has a recess 3h that is configured to the cylindrical surface 3f of the frame 3a. The cover 3b has a paper-receiving opening 3s formed beside the recess 3h. The cover 3b has a plurality of ribs 3x formed thereon, the ribs 3x extending in a direction in which the recording paper is transported. The paper-receiving opening 3s is a slit-like opening that longitudinally extends across the path 6d. The recording paper 7 is introduced into the image-recording apparatus 1 through the paper-receiving opening 3s. There is provided a film 30 that extends from the recess 3h and across the path 6d to guide the recording paper 7 that comes into the paper-transporting unit 3 through the paper-receiving opening 3s. The cover 3b also has four pressure roller mechanisms 17.

Each pressure roller mechanism 17 includes the pressure rollers 17a, a bracket 17c, and a compression spring 17d. The four pressure rollers 17a function as driven rollers in pressure contact with the four transport rollers 13. The bracket 17c has a shaft 17b on which the pressure roller 17a is rotatably mounted. The compression spring 17d is loaded between the bracket 17c and the cover 3b to urge the pressure roller 17a against the transport roller 13.

There are provided three sets of pressure roller mechanisms 18A–18C on the underside of the cover 3b, the three sets of pressure roller mechanisms 18A–18C opposing the three sets 10, 11, 12 of transport rollers provided on the frame 3a, respectively. Each set of the pressure roller mechanisms 18A–18C includes four sub-mechanisms 18-1 to 18-4 and each set of the transport rollers includes four rollers.

Each of the four sub-mechanisms 18-1 to 18-4 includes a pressure roller 18a, a shaft 18b, and a pair of torsion springs 18c. The pressure roller 18a is rotatable on the shaft 18b. The shaft 18b is slightly movable relative to the cover 3b. The torsion springs 18c, loaded between the shaft 18b and the cover 3b, urge the shaft 18b in a direction away from the underside of the cover 3b so that when the cover 3b is closed, the pressure roller 18a is in pressure contact with the transport roller.

In this embodiment, the recording paper 7 is sandwiched between the pressure rollers 17a, 18a, and the transport rollers 10–13. In stead, a belt or other transporting means may be used to advance the recording paper 7.

Figure 15A:
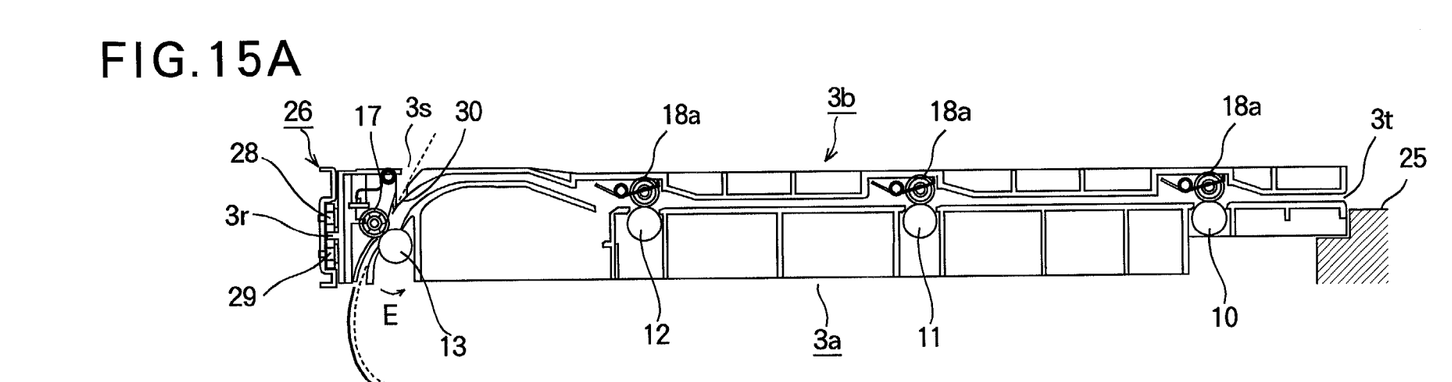
FIGS. 15A–15C illustrate the operation of the paper-transporting unit.
Figure 15B:
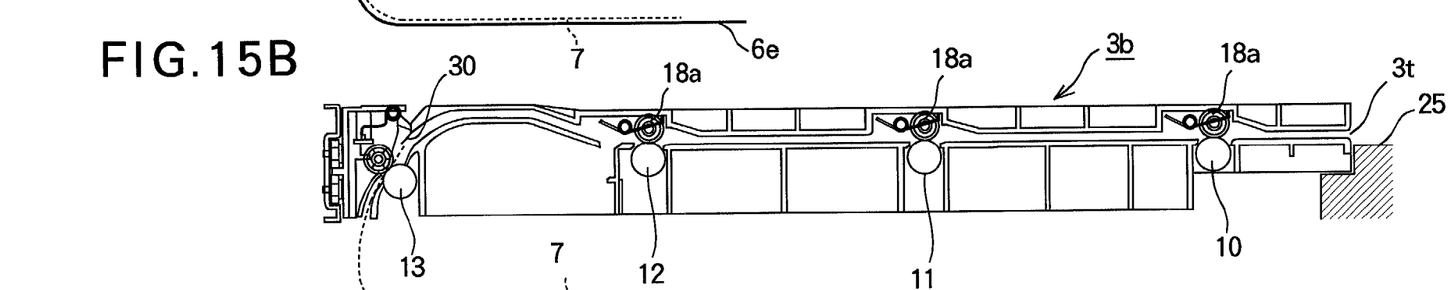
Figure 15C:
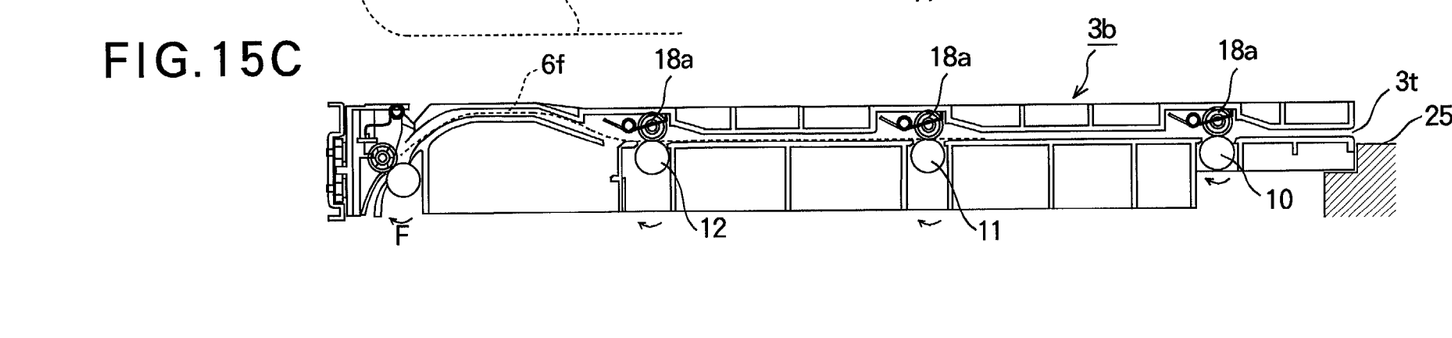

When the paper-transporting unit 3 is in the image-recording apparatus, the paper-transporting unit 3 is supported and guided by the guide rail 26 and a stage 25 (FIGS. 15A–15C). The stage 25 is provided on the inner right side of the image-recording apparatus 1 and supports the right side of the paper-transporting unit 3. The guide rail 26 is provided on the inner left side, depicted by dotted lines in FIG. 4, of the image-recording apparatus 1. The guide rail 26 extends in a direction parallel to the directions shown by arrows A and B.

Figure 11:
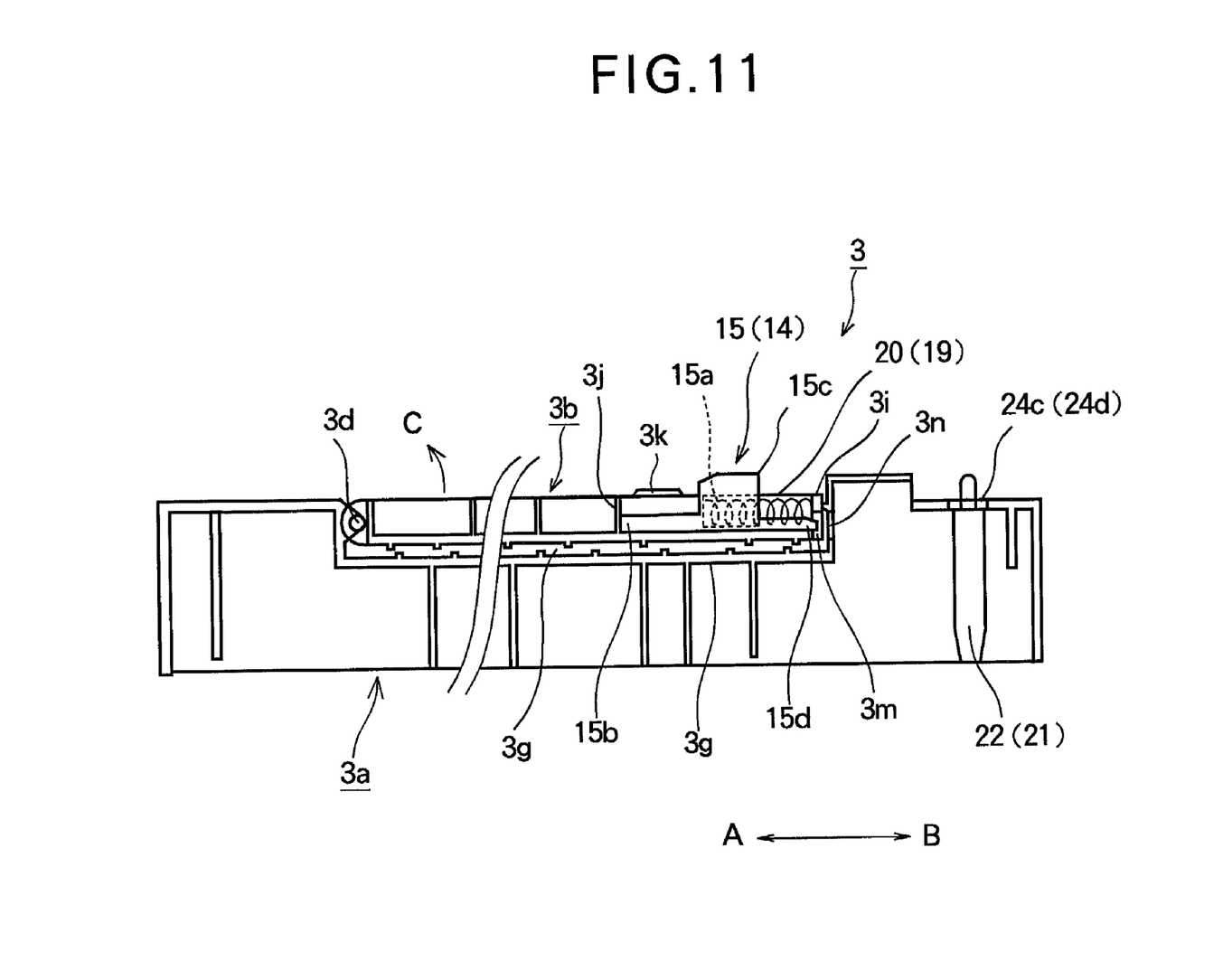
FIG. 11 is a side view of the paper-transporting unit when it has been drawn in a direction shown by arrow B from the image-recording apparatus of FIG. 4.

FIG. 11 is a side view of the paper-transporting unit 3 when it has been drawn out completely in a direction shown by arrow B from the image-recording apparatus of FIG. 4.

Figure 12A:
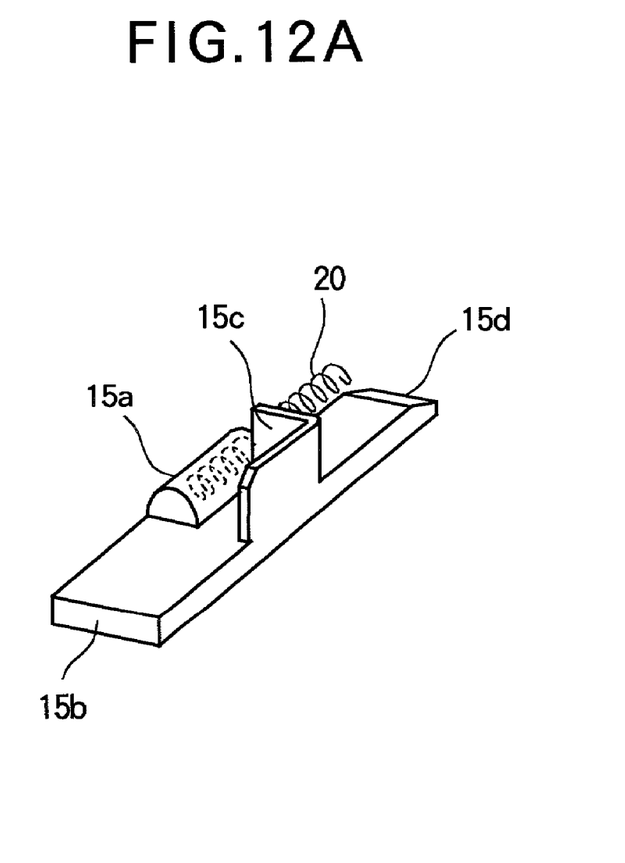
FIGS. 12A and 12B are perspective view of cover-locking members.
Figure 12B:
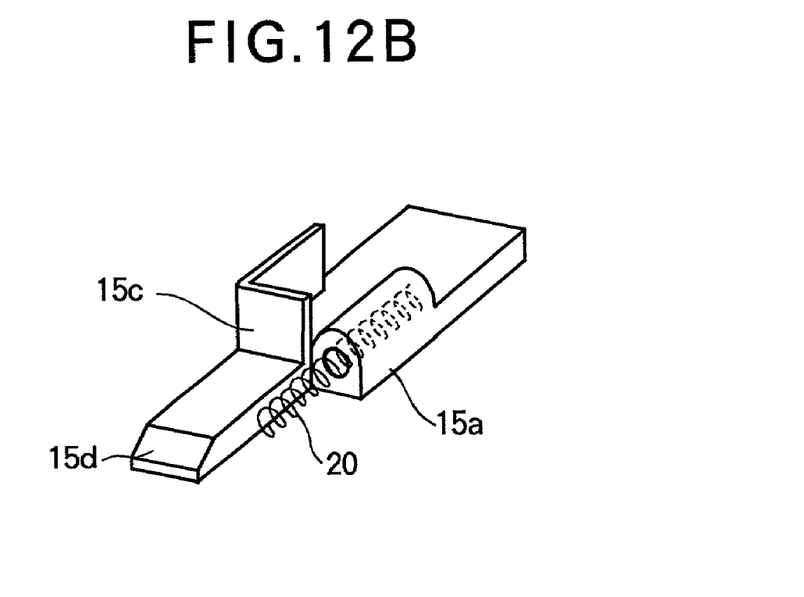

FIGS. 6A and 6B are perspective view of cover-locking members.

Referring to FIG. 11, the cover 3b is pivotally supported on the frame 3a by means of the shaft 3d. The cover 3b rests over a paper-transporting section 3g (FIG. 6) of the frame 3a with the pressure rollers 17a and 18a (FIG. 10) in contact with the corresponding transport rollers 10–13.

The cover 3b has two cover-locking members 14 and 15 provided on a side opposite to the side at which bearings 3c are provided. The cover-locking members 14 and 15 are slidable in directions shown by arrows A and B. The cover-locking member 15 (14) is urged in the direction shown by arrow A by a compression spring 20 (19) loaded between the cover-locking members 14 (15) and a front wall 3i of the cover 3b. The spring (20 (19) is partially received in a spring-receiving hole 15a. The cover-locking member 15 (14) has an end 15b urged against an inner wall 3j of the cover 3b. The cover-locking member 15 (14) and the compression spring 20 (19) form a cover-locking mechanism that securely locks the cover 3b to the frame 3a.

The paper-transporting unit 3 is housed in an accommodating section having an upper frame 24 formed of a sheet metal. The upper frame 24 has two projections 24a, two stoppers 24b, and fitting holes 24c and 24d. The stopper 24b extends downward from the frame 24. Each projection 24a has a flat surface and beveled surfaces that project downward. Two projections 3k and 3w (FIGS. 5A–5B) project upwardly from the cover 3b of the paper-transporting unit 3. Each of the projections 3k and 3w has a flat top surface and beveled surfaces. As the paper-transporting unit 3 is moved into the image-recording apparatus, the projections 24a are brought into slidable contact with the projections 3k and 3w, respectively, thereby preventing the cover 3b from rotating in a direction that the cover 3b opens relative to the frame 3a. The positional relation between the projections 24a and the projections 3k and 3w is such that the projections 24a are brought out of engagement with the projections 3k and 3w when the paper-transporting unit 3 has been completely pushed into the image-recording apparatus. When the paper-transporting unit 3 is pushed into the image-recording apparatus 1, the stopper 24b engages an engagement portion 15c formed on the cover-locking member 15. The fitting holes 24c and 24d fittingly receive post-lock members 21 and 22 formed on the frame 3a.

The cover-locking members 14 and 15 are of the same construction and operate in the same way. The stoppers 24b cooperate with the cover-locking members 14 and 15 to lock to the frame 3a or position the cover 3b relative to the frame 3a.

{Operation of Cover-locking Members}

A description will be given of the operation of the cover-locking members when the paper-transporting unit 3 is moved between an unloading position and a loading position. The operation will be described with reference to FIGS. 11, 13, and 14.

The unloading position is a position where the paper-transporting unit 3 has been completely drawn out from the image-recording apparatus.

The loading position is a position where the paper-transporting unit 3 has been completely accommodated in the image-recording apparatus.

As shown in FIG. 11, when the paper-transporting unit 3 has been drawn out of the image-recording apparatus, an end 15d of the cover-locking member 15 does not project through an opening 3m formed in the front wall 3i of the cover 3b. The user can rotate the cover 3b in a direction shown by arrow C to a position shown in FIG. 4 and FIGS. 5A and 5B. Then, the user can access the paper-transporting unit 3 to remove jammed paper from the paper-transporting unit 3.

After the cover 3b has been closed to a position shown in FIG. 11, the user starts to move the paper-transporting unit 3 in the direction shown by arrow A into the image-recording apparatus 1.

Figure 13:
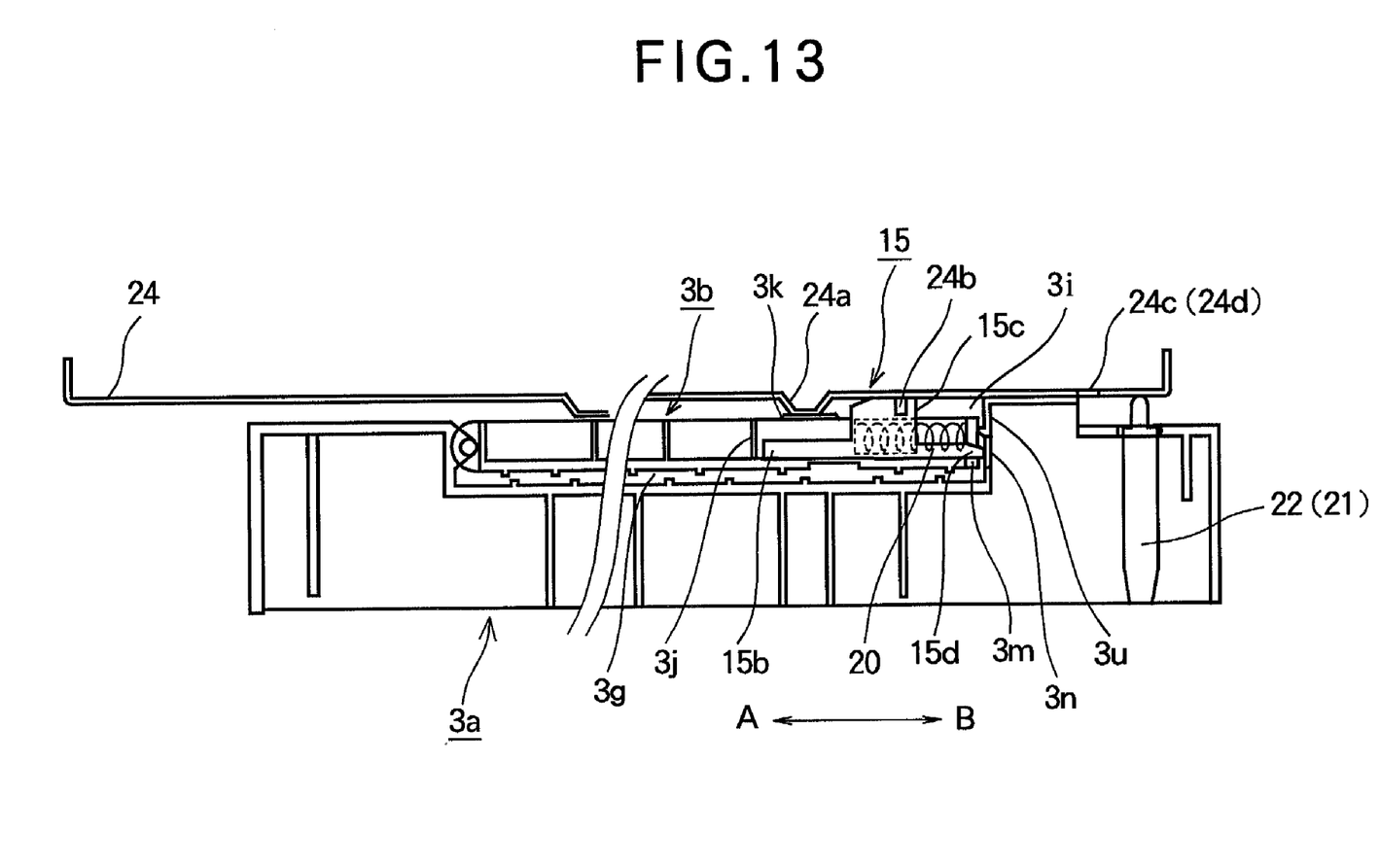
FIG. 13 is a side view of the paper-transporting unit when it is being moved in a direction shown by arrow A into the image-recording apparatus from the position shown in FIG. 11.

FIG. 13 is a side view of the paper-transporting unit 3 when it is being moved in a direction shown by arrow A toward the loading position from the unloading position shown in FIG. 11.

As the user moves the paper-transporting unit 3 into the image-recording apparatus 1, as shown in FIG. 13, the projection 3k (3w) formed on the upper surface of the cover 3b abuts the projection 24a on the upper frame 24. As the paper-transporting unit 3 moves into the image-recording apparatus, the projection 24a sliding on the projection 3k (3w) as well as pressing the projection 3k (3w). With the projection 3k (3w) pressed, the cover 3b is maintained at a certain angular position with respect to the upper frame 24. Then, the engagement portion 15c of the cover-locking member 15 engages the stopper 24b on the upper frame 24.

As a result, the stopper 24b blocks the engagement portion 15c, preventing a further movement of the cover-locking member 15 into the image-recording apparatus. As the paper-transporting unit 3 is further advanced in the direction shown by arrow A, the compression spring 20 is progressively compressed and allows the end 15d to extend through the opening 3m formed in the cover 3b.

Figure 14:
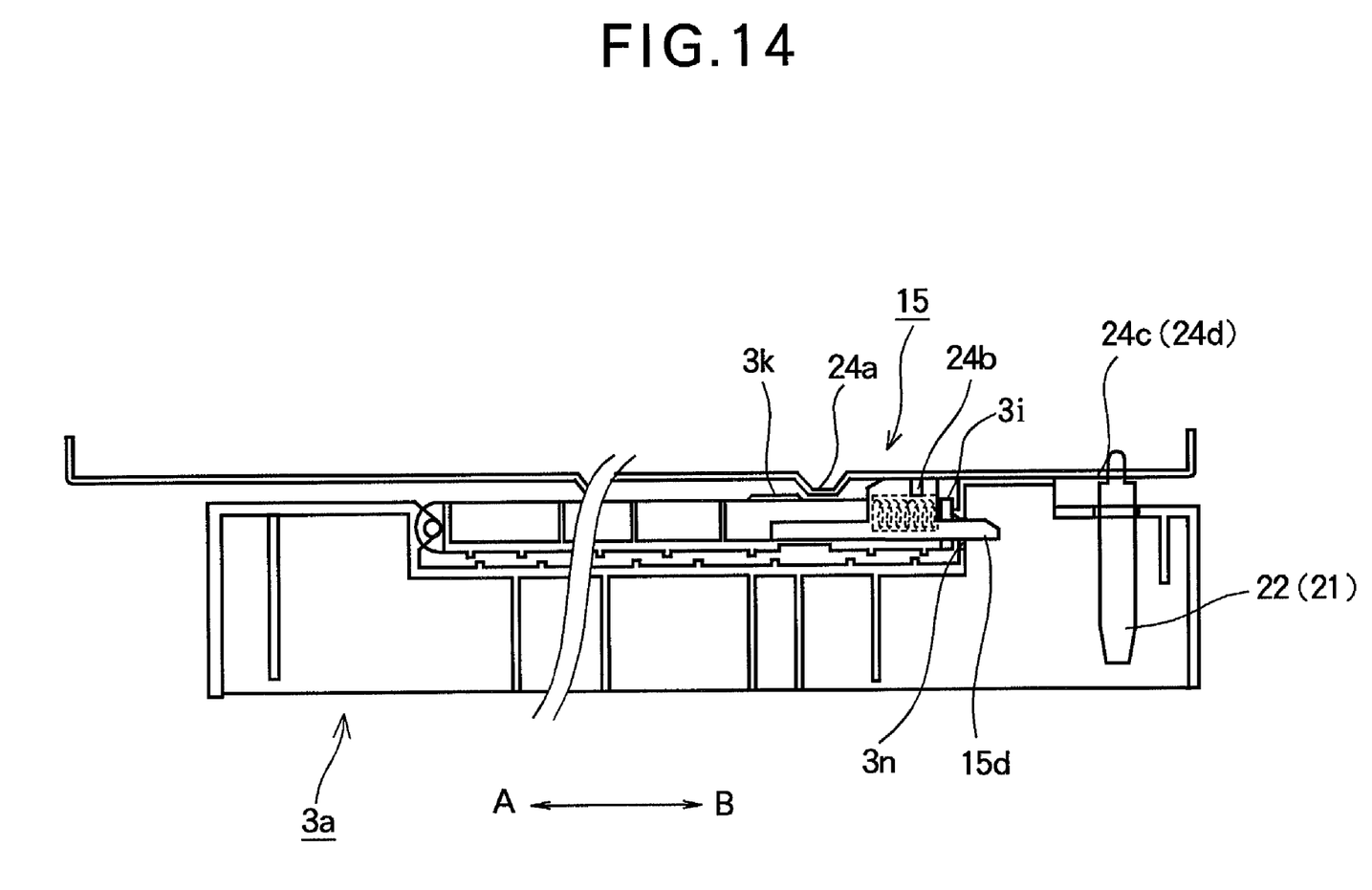
FIG. 14 is a side view of the paper-transporting unit when it has been moved completely in the direction shown by arrow A into the image-recording apparatus.

FIG. 14 is a side view of the paper-transporting unit 3 when it has been moved to the loading position.

As the paper-transporting unit 3 is yet further advanced in the same direction, the end 15d of the cover-locking member 15 extends into an opening 3n formed in a front wall 3u of the frame 3a. Then, the paper-transporting unit 3 is completely placed at the loading position in the image-recording apparatus 1 as shown in FIG. 14.

When the paper-transporting unit 3 has been completely pushed into the image-recording apparatus, the pair of post lock members 21 and 22 (FIG. 6) slide upward to fit into fitting holes 24c and 24d formed in the upper frame 24, thereby locking the paper-transporting unit 3 to the loading position.

In order to draw the paper-transporting unit 3 out of the image-recording apparatus 1, the pair of post lock members 21 and 22 (FIG. 6) are first caused to slide down and pulled out of the fitting holes 24c and 24d. At this moment, the paper-transporting unit 3 pops out in the direction shown by arrow B with the aid of spring force of the compression springs 19 and 20. Thus, the end 15d of the cover-locking member 15 moves out of the opening 3n, so that the end 15b of the cover-locking member 15 again abuts the inner wall 3j (FIG. 13).

Then, the user pulls out the paper-transporting unit 3 still further in the direction shown by arrow B until the paper-transporting unit 3 is completely drawn out (FIGS. 4 and 11).

When the paper-transporting mechanism 3 moves, because the end 15d enters the opening 3n, the cover 3b can be accurately positioned at a predetermined angular position with respect to the upper frame 24. This angular position of the cover 3b with respect to the frame 3a is such that the pressure rollers 17a and 18a on the cover 3b are in contact with the transport rollers while being urged by the compression springs 17d and the torsion springs 18c. The urging force of these springs applies a predetermined pressure on the rollers so that the recording paper sandwiched between the drive rollers and driven rollers can be smoothly transported.

When the post lock members 21 and 22 have fitted into the fitting holes 24c and 24d, the compressed springs 19 and 20 urge the frame 3a in the direction shown by arrow B. Therefore, the frame 3a firmly presses the post lock members 21 and 22 in the direction shown by arrow B, preventing the paper-transporting unit 3 from rattling.

{Printing on Both Sides of the Paper}

The operation of the paper-transporting unit 3 will be described when printing is performed on the both sides of the recording paper.

FIGS. 15A–15C illustrate the operation of the paper-transporting unit 3.

Referring to FIGS. 15A–15C, the four transport rollers 13 (FIG. 6) rotate operatively together with other sets 10–12 of transport rollers in a direction as shown by arrow E, so that the recording paper 7 is pulled into the auxiliary space 6e.

The recording paper 7 is fed from the paper cassette 5 through the path 6a of FIG. 1 and then passes through the path 6b so that printing is performed on a front side of the recording paper 7. Then, the recording paper 7 is guided by the paper guide 2b into the path 6d and enters the paper-receiving opening 3s as shown in a dotted line in FIG. 15A.

When the trailing end portion of the recording paper 7 passes the film 30, the transport rollers 13 stop rotating temporarily, and subsequently rotate in a direction shown by arrow F, i.e., in a reverse direction. Thus, the recording paper 7 now travels backward to enter the path 6f and advances along the path 6f while being sandwiched between the sets 10–12 of transport rollers and the pressure rollers 18a. Then, the recording paper 7 is discharged through a discharge opening 3t and enters the path 6b so that printing is performed on a backside of the recording paper 7. Then, the recording paper 7 is finally discharged through the discharge section 2c.

The paper-transporting unit 3 of the aforementioned construction is advantageous in that even when the paper is jammed, the guide rail 26 allows smooth drawing out of the paper-transporting unit 3 from the image-recording apparatus without the cover 3b fluttering.

The cover 3b is securely fastened to the frame 3a at three sides by three structural elements, i.e., the bearings 3e, the cover-locking members 14 and 15, and the rollers 28 and 19. This construction minimizes warping of the cover 3b, maintaining a uniform contact pressure between the four transport rollers 13 in line with one another and the four pressure rollers 17a (FIG. 10) in line with one another, as well as facilitating smooth transporting of the recording paper.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A paper-transporting apparatus comprising:
   a paper-transporting unit movable between a loading position where the paper-transporting unit has been completely attached into a chassis and an unloading position where the paper-transporting unit has been completely drawn out of the chassis, said paper-transporting unit comprising a first section and a second section that cooperate with each other to transport the paper;
   a guide member that supports said paper-transporting unit and guides said paper-transporting unit between the loading position and the unloading position; and
   a positioning device including an engagement member comprised of one of the first section and the second section,
   wherein when said paper-transporting unit is at the loading position, the engagement member provided on one of the first section and the second section engages the other of the first section and the second section to bring the first section and the second section into engagement with each other; and
   wherein, when said paper-transporting unit is at the unloading position, the engagement member provided on one of the first section and the second section does not engage the other of the first section and the second section, whereby the first section and the second section are brought out of engagement with each other.

2. The paper-transporting apparatus according to claim 1, wherein the first section includes a drive roller and the second section includes a driven roller,
   wherein one of the drive roller and the driven roller is resiliently urged against the other of the drive roller and the driven roller to hold the paper between the drive roller and the driven roller.

3. A paper-transporting apparatus comprising:
   a paper-transporting unit movable between a loading position where the paper-transporting unit has been completely attached into a chassis and an unloading position where the paper-transporting unit has been completely drawn out of the chassis, said paper-transporting unit comprising a first section and a second section that cooperate with each other to transport the paper;
   a guide member that supports said paper-transporting unit and guides said paper-transporting unit between the loading position and the unloading position; and
   a positioning unit provided either on the first section or on the second section,
   wherein said positioning unit holds the first section at a certain position with respect to the second section when said paper-transporting unit is at the loading position,
   wherein said positioning unit does not hold the first section at the certain position with respect to the second section when said paper-transporting unit is at the unloading position;
   wherein said positioning unit includes:
   a first engagement member movable relative to the second section toward the loading position and toward the unloading position, said first engagement member being urged toward the loading position;
   a second engagement member fixedly provided on the chassis, wherein when said paper-transporting unit is moved toward the loading position from the unloading position, said second engagement member engages said first engagement member to prevent said first engagement member from further moving toward the loading position so that the first engagement member moves relative to said second section to engage the first section.

4. A paper-transporting apparatus comprising:
   a paper-transporting unit movable between a loading position where the paper-transporting unit has been completely attached into a chassis and an unloading position where the paper-transporting unit has been completely drawn out of the chassis, said paper-transporting unit comprising a first section and a second section that cooperate with each other to transport the paper;
   a guide member that supports said paper-transporting unit and guides said paper-transporting unit between the loading position and the unloading position; and
   a positioning device that holds the first section at a certain position with respect to the second section when said paper-transporting unit is at the loading position, said positioning device does not hold the first section at the certain position with respect to the second section when said paper-transporting device is at the unloading position;
   wherein said guide member includes:
   a guide rail that guides said paper-transporting unit between the loading position and the unloading position, said guide rail having a plurality of guide rollers disposed along said guide rail;
   a first projection formed on the first section to extend along said guide rail; and
   a second projection formed on the second section to extend along said guide rail; and
   wherein said first projection and said second projection are placed together and supported on said guide rail such that said first projection and said second projection are movably sandwiched between the guide rollers.

5. The paper-transporting apparatus according to claim 3, wherein when said paper-transporting unit is at a position between the loading position and the unloading position, a part of the chassis presses against the second section such that the second section is positioned with respect to the first section before the second engagement member engages the first engagement member.

6. The paper-transporting apparatus according to claim 5, wherein when said paper-transporting reaches the loading position, the part of the chassis does not press the second section.

* * * * *